United States Patent
Yoshida et al.

(10) Patent No.: US 9,254,799 B2
(45) Date of Patent: Feb. 9, 2016

(54) POWER SOURCE CONTROL APPARATUS FOR VEHICLE

(71) Applicant: MAZDA MOTOR CORPORATION, Hiroshima (JP)

(72) Inventors: Katsumasa Yoshida, Hiroshima (JP); Shosuke Morimoto, Hiroshima (JP); Kazuya Kotani, Hiroshima (JP); Tomoyuki Imamura, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 278 days.

(21) Appl. No.: 13/891,032

(22) Filed: May 9, 2013

(65) Prior Publication Data
US 2013/0320931 A1    Dec. 5, 2013

(30) Foreign Application Priority Data
Jun. 1, 2012  (JP) .................. 2012-126218

(51) Int. Cl.
*H02J 7/00* (2006.01)
*B60R 16/033* (2006.01)
*B60R 16/03* (2006.01)

(52) U.S. Cl.
CPC ........... *B60R 16/033* (2013.01); *B60R 16/0307* (2013.01); *Y02T 10/92* (2013.01)

(58) Field of Classification Search
CPC ......... B60L 11/005; B60W 10/00; B60K 6/28
USPC ........................................ 320/135
See application file for complete search history.

(56) References Cited

U.S. PATENT DOCUMENTS

| | | | |
|---|---|---|---|
| 6,889,762 B2 * | 5/2005 | Zeigler et al. .................. 165/240 |
| 7,419,020 B2 * | 9/2008 | Pott .......................... B60K 6/28 |
| | | | 180/65.1 |
| 2006/0097577 A1 | 5/2006 | Kato et al. | |
| 2009/0096285 A1 * | 4/2009 | Acena et al. ................. 307/10.1 |
| 2011/0025127 A1 * | 2/2011 | Choi et al. .................. 307/10.1 |
| 2011/0115288 A1 * | 5/2011 | Lee ........................ B60K 6/485 |
| | | | 307/10.1 |
| 2012/0095644 A1 * | 4/2012 | Dessirier et al. ................ 701/36 |
| 2012/0296506 A1 * | 11/2012 | Kotani ...................... H02J 1/00 |
| | | | 701/22 |

* cited by examiner

*Primary Examiner* — Edward Tso
*Assistant Examiner* — Johali Torres Ruiz
(74) *Attorney, Agent, or Firm* — Studebaker & Brackett PC

(57) ABSTRACT

A battery, a regenerative generator, a capacitor capable of storing power generated by the regenerative generator, and a DC/DC convertor capable of allowing an output current to flow up to a specified permissible limit value are provided. The capacitor is connected to a first circuit portion connecting the regenerative generator and the DC/DC convertor. The battery is connected to a second circuit portion connecting the DC/DC convertor and electric loads. Thereby, power from the capacitor is supplied to electric loads by way of the DC/DC convertor until the output current of the DC/DC convertor reaches the specified permissible limit value, whereas power from the battery is supplied to the electric loads after the output current of the DC/DC convertor has reached the specified permissible limit value. A specified electric load is turned OFF when the power from the battery is supplied.

4 Claims, 6 Drawing Sheets

POWER SOURCE CONTROL APPARATUS FOR VEHICLE

BACKGROUND OF THE INVENTION

The present invention relates to a power-source control apparatus for a vehicle which is equipped with a regenerative generator conducting deceleration regeneration, and in particular to a power-source control apparatus for a vehicle which can provide a stable power supply even when a load of electric devices is high.

Recent years, a vehicle which has a function of regenerating deceleration energy at the time of deceleration of the vehicle and utilizing the regenerated energy as a power supply to electric devices, in addition to improving combustion of an engine, reducing vehicle weight, and so on, in order to improve the fuel efficiency (gas mileage) has been put to practical use.

US Patent Application Publication No. 2006/0097577 A1, for example, discloses a vehicle power supply system which comprises a main power source for power supply to a starter and general electric devices, which is comprised of a normal battery, an auxiliary power source for a regenerative power storage to store power generated by an alternator, which is comprised of a Li (Lithium) ion battery, and a DC/DC convertor and a switch which are provided between the main power source and the auxiliary power source to control power charge/discharge.

In the system described above, however, since the battery of the main power source may deteriorate through its frequent charge/discharge, it may be necessary that the charge of the battery is restricted and a burden of the auxiliary power source is increased. Further, there is a problem in that if the amount of power storage of the auxiliary power source is small, a sufficient amount of power may not be supplied to the electric devices.

Accordingly, it is considered that a capacitor having a high capacity with a relatively high storage voltage (25 V) is used as a regenerative power storage means which does not improperly deteriorate through its frequent charge/discharge, but has a sufficient power-storage amount.

However, in a case in which the above-described capacitor having the high capacity is used, even when the load of the electric devises is high and the output of the capacitor is sufficient, if a capacity (output current) of the DC/DC convertor provided between the electric devices and the capacitor is short, the sufficient power may not be supplied to the electric devices. Accordingly, it may be necessary that the capacity of the DC/DC convertor is made higher according to the maximum electric load of the electric devices. This may cause problems of a cost increase as well as a large size.

Herein, it may be considered that the power supply from the battery is additionally conducted in order to supply the sufficient power to the electric devices, restraining the capacity of the DC/DC convertor. However, if a remaining capacity of the battery becomes too low, that is—the battery is excessively discharged, there is a concern that problems of the battery being dead or the battery's deterioration may occur.

SUMMARY OF THE INVENTION

Accordingly, an object of the present invention is to provide a power-source control apparatus for a vehicle which can properly correspond to the high electric loads, preventing any improper deterioration caused by the excessive discharge of the battery, in a case in which the capacitor is used as a regenerative power storage means.

According to the present invention, there is provided a power-source control apparatus for a vehicle, comprising a battery, a regenerative generator capable of a deceleration-regeneration power generation conducted at the time of deceleration of the vehicle and a normal power generation conducted by an engine drive, a capacitor capable of storing power generated by the regenerative generator thereat, a DC/DC convertor capable of converting an output voltage and allowing an output current to flow up to a specified permissible limit value, plural electric loads, a first circuit portion connecting the regenerative generator and the DC/DC convertor, and a second circuit portion connecting the DC/DC convertor and the plural electric loads, wherein the capacitor is connected to the first circuit portion and the battery is connected to the second circuit portion such that power generated by the regenerative generator is stored at the capacitor and the power stored at the capacitor is supplied to the plural electric loads by way of the DC/DC convertor until the output current of the DC/DC convertor, which increases in accordance with power consumption by the electric loads, reaches the specified permissible limit value, whereas power from the battery is supplied to the plural electric loads after the output current of the DC/DC convertor has reached the specified permissible limit value, and a control device to turn OFF a specified electric load of the plural electric loads when the power from the battery is supplied to the plural electric loads is provided.

According to the present invention, since the capacitor is used as a means for storing the power generated by the regenerative generator, it may not improperly deteriorate through its frequent charge/discharge, but may have a sufficient power-storage amount. Further, since the power is supplied from the battery even in a case in which the gross current consumed by the plural electric loads exceeds the permissive limit value (permissive output current value) of the DC/DC convertor, it may not be necessary to increase the capacity of the DC/DC convertor. Moreover, a specified electric load is turned OFF when the power from the battery is supplied to the plural electric loads. Accordingly, the gross current consumed by the electric loads decreases, so that any excessive discharge of the battery can be prevented, thereby avoiding any deterioration of the battery.

According to an embodiment of the present invention, the power-source control apparatus for a vehicle further comprises a bypass circuit portion connecting the first circuit portion and the second circuit portion, bypassing the DC/DC convertor, a switch provided at the bypass circuit portion to change a state of connection/disconnection of the bypass circuit portion, and a switch changing device to output a drive signal to the switch for changing the state of connection/disconnection of the bypass circuit portion. Thereby, a short-circuit state between the first circuit portion and the second circuit portion can be controlled by the switch, so that power-supply paths to the plural electric loads can be easily changed (respective paths of a power supply from the capacitor by way of the DC/DC convertor, a power supply from the battery, or a direct power supply from the regenerative generator).

Preferably, the switch changing device outputs the drive signal for disconnection of the bypass circuit portion to the switch when the power from the capacitor or the battery is supplied to the plural electric loads. Thereby, preferable power supplies from the capacitor by way of the DC/DC converter or from the battery can be achieved according to states.

Further, preferably, the switch changing device outputs the drive signal for connection of the bypass circuit portion to the switch when a difference of voltages at both ends of the bypass circuit portion becomes relatively small. Thereby, an ON operation of the switch for the connection state of the bypass circuit portion is achieved when the difference of voltages of the second circuit portion connecting to the plural electric loads and the first circuit portion connecting to the capacitor becomes relatively small. Accordingly, it can be properly avoided that any improper voltage higher than regular voltages of the electric loads is impressed or a contact of the switch improperly melts, thereby ensuring the reliability of the apparatus effectively.

Herein, determination of the difference of voltages at both ends of the bypass circuit portion becoming relatively small is achieved by determining that a difference between a voltage of the capacitor and a voltage of the battery becomes less than a specified value.

In this case, preferably, the power-source control apparatus for a vehicle further comprises voltage sensors to detect the voltage of the capacitor and the voltage of the battery, respectively, and the determination of the difference between the voltage of the capacitor and the voltage of the battery becoming less than the specified value is made based on detection values of the voltage sensors.

Alternatively, the determination of the difference of voltages at both ends of the bypass circuit portion becoming relatively small may be achieved by determining that the time having passed from the timing when the output current of the DC/DC convertor has reached the specified permissible limit value becomes longer than a specified period of time.

According to another embodiment of the present invention, the control device is configured to turn ON the specified electric load which has been turned OFF when the switch changing device drives the switch so as to provide a connection state of the bypass circuit portion. Thereby, when the power supply from the regenerative generator to the plural electric loads and the battery by way of the bypass circuit portion becomes possible, the specified electric load which has been turned OFF is turned ON again. Accordingly, the power can be supplied to the electric loads sufficiently even when the electric loads are high, preventing any excessive discharge of the battery.

According to another embodiment of the present invention, the supply of the power stored at the capacitor to the plural electric loads by way of the DC/DC convertor which is conducted until the output current of the DC/DC convertor reaches the specified permissible limit value is limited to a case in which a remaining capacity of the battery is relatively high. Thereby, when the remaining capacity of the battery becomes small, storing the power generated by the regenerative generator at the battery (i.e., battery charging) is enabled, thereby avoiding any deterioration of the battery.

Herein, preferably, determination of the case in which the remaining capacity of the battery is relatively high is achieved by determining that a presumptive remaining-capacity value which is presumed from a voltage of the battery is greater than a specified value.

According to another embodiment of the present invention, the above-described specified electric load is a temperature adjusting means of a specified vehicle-onboard component. The temperature adjusting means is a means for adjusting the temperature of a component which is installed to the vehicle. Herein, since the component itself has a certain degree of thermal capacity, even if the component is turned OFF temporarily, its temperature may not change quickly. Accordingly, a driver of the vehicle may not receive any influence on the driver's driving, and also the driver may not have any uncomfortable feeling, either. The temperature adjusting means is a compressor or heater of an air conditioner, a heater of a seat cushion, a defogger of a windshield, or the like, for example. Thus, according to the present embodiment, since the specified electric load to be turned OFF is the temperature adjusting means of the specified vehicle-onboard component and even if the component is turned OFF temporarily, its temperature may not change quickly, the battery's excessive discharge can be prevented, without making the driver having any uncomfortable feeling.

According to another embodiment of the present invention, the plural electric loads are a group of electric loads capable of corresponding to voltage decrease, and another group of electric loads incapable of corresponding to voltage decrease are connected to the DC/DC convertor via a third circuit portion independent from the second circuit portion. Herein, the group of electric loads capable of corresponding to voltage decrease means electric devices which can operate normally even when the voltage decreases, which are a lamp, engine control unit, defogger, blower, seat heater, power window, ignition, DSC (dynamic stability control), EPAS (electric power steering) or the like, for example. Meanwhile, the group of electric loads incapable of corresponding to voltage decrease means electric devices which cannot operate normally if the voltage decreases, which are an audio device, navigation system, temperature sensor or the like, for example. According to the present embodiment, since the group of electric loads incapable of corresponding to voltage decrease always receives the power supply via the DC/DC convertor, any improper voltage higher than the regular voltage is not impressed to this group of electric loads, thereby ensuring the reliability of this group.

Other features, aspects, and advantages of the present invention will become apparent from the following description which refers to the accompanying drawings.

DETAILED DESCRIPTION OF THE INVENTION

Hereafter, a preferred embodiment of the present invention will be described.

Figure 1:
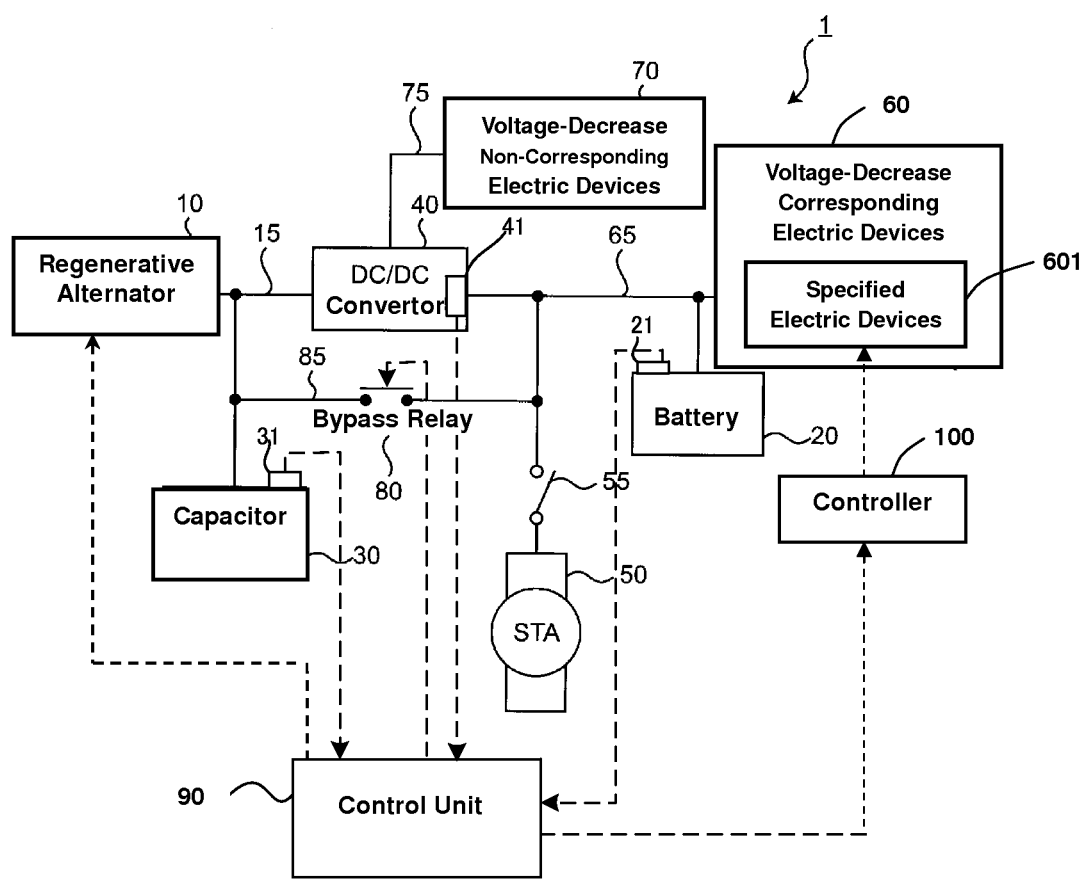
FIG. 1 is a block diagram of a deceleration-regeneration system to materialize a power-source control apparatus for a vehicle according to the present invention.

FIG. 1 shows a deceleration-regeneration system 1, to which a power-source control apparatus for a vehicle of the present embodiment is applied. The deceleration-regeneration system 1 comprises a regenerative alternator 10 which is capable of a deceleration-regeneration power generation conducted at the time of deceleration of the vehicle and a normal power generation conducted by driving an engine (not illustrated), a battery 20, a capacitor 30 which is capable of storing the power generated by the regenerative alternator 10, a DC/DC convertor 40 which controls power supply to plural voltage-decrease corresponding electric devices (plural electric devices capable of corresponding to voltage decrease) 60 (including specified electric devices 601 as a specified electric load) and voltage-decrease non-corresponding electric devices (electric devices incapable of corresponding to voltage decrease) 70 which are installed to a vehicle, a starter 50 which starts the engine of the vehicle, a bypass relay 80 as a switch which is provided at a bypass circuit portion 85 which bypasses the DC/DC convertor 40 to change a state of connection/disconnection of this bypass circuit portion 85, and a control unit 90. The control unit 90 is configured to output control (drive) signals to a controller 100 which can control an operation state (operation/non-operation) of the above-described specified electric devices 601 and the above-described bypass relay 80, respectively.

Herein, a "control device" recited in claim 1 of the present application is functionally constituted by the control unit 90 and the controller 100, and the control unit 90 also functionally constitutes a "switch changing device" recited in claim 2.

The regenerative alternator 10 and the DC/DC convertor 40 are connected by a first circuit portion 15, and the capacitor 30 is connected to this first circuit portion 15. Further, the DC/DC convertor 40 and the voltage-decrease corresponding electric device 60 are connected by a second circuit portion 65, and the battery 20 is connected to this second circuit portion 65. Moreover, the voltage-decrease non-corresponding electric devices 70 are connected to the DC/DC convertor 40 via a third circuit portion 75 independently from the second circuit portion 65.

Further, the starter 50 is connected to the second circuit portion 65 via a starter switch 55. The first circuit portion 15 and the second circuit portion 65 are short-circuited by the above-described bypass relay 80 which is turned ON so as to provide the connection state of the bypass circuit portion 85.

The regenerative alternator 10, which is driven by the engine with a belt, is a variable voltage (12-25 V) type of alternator which efficiently regenerates the kinetic energy at the time of deceleration of the vehicle and the like for power regeneration. The voltage of the regenerative alternator 10 can be increased up to the maximum 25 V for efficient power supply and storage.

The battery 20 is an ordinary Pb (Lead) battery. Herein, at the battery 20 is provided a voltage sensor 21 which detects the voltage of the battery 20 and outputs a detected voltage value to the above-described control unit 90.

The capacitor 30 is a high-capacity and low-resistance electric double-layer capacitor (EDLC) which can store a high-capacity regenerated electric energy quickly and take out the stored electric energy efficiently for use. The capacitor 30 can generate the maximum voltage up to 25 V. Compared with a Li (Lithium) ion battery used for electric automotive vehicles or the ordinary Pb battery, the capacitor 30 is more advantageous in quick power-storage (for several minutes during a vehicle traveling at the speed of 50-60 km/h), the unlimited depth of discharge, the semi-permanent durability, and the like. Herein, at the capacitor 30 is provided a voltage sensor 31 which detects the voltage of the capacitor 30 and outputs a detected voltage value to the above-described control unit 90.

The DC/DC convertor 40 outputs its voltage by decreasing the maximum DC 25 V down to DC 14 V, and is capable of flowing up to a specified output current (up to a permissible output current-value (permissible limit value) of 50 A). Specifically, the DC/DC convertor 40 includes a limit circuit to limit its output current to the permissible output current-value (the permissible limit value: 50 A) when the output current exceeds this permissible output current-value. Accordingly, the output current of the DC/DC convertor 40 is limited so as not to become greater than the permissible output current-value (the permissible limit value: 50 A) by the above-described limit circuit. Further, when this limiting of the output current works (operates), the DC/DC convertor 40 is configured to output a notice signal for notifying this limiting situation to the control unit 90 from an output portion 41 provided thereat. In general, the DC/DC converter becomes larger sized and more expensive as the capacity of the DC/DC convertor becomes higher.

Electric devices installed to the vehicle may be divided into two categories generally, that is—electric devices which correspond to a voltage decrease, and electric devices which do not correspond to the voltage decrease. The former, i.e., the voltage-decrease corresponding electric devices 60 are, for example, a lamp, defroster, defogger, blower, seat heater, fan, ignition, engine control unit, DSC (dynamic stability control), EPA (electromotive power steering), power window and the like. The later, i.e., the voltage-decrease non-corresponding electric devices 70 are, for example, an audio, navigation system, temperature sensor and the like.

Herein, in the deceleration-regeneration system 1, the power generation by the regenerative alternator 10 is not conducted as long as the sufficient power remains at the battery 20 or the capacitor 30 even at the times of idling stop or accelerator ON. Thereby, this remaining power is used properly, so that the power generation by the engine consuming the fuel can be restrained, thereby improving the fuel economy. Further, when the vehicle travels in an urban area (town), acceleration and deceleration of the vehicle happen often, so that the power may be stored and kept at the capacitor 30 all the time without shortage. Thereby, the necessary power for the vehicle traveling may be obtained mostly from the deceleration regenerative energy.

Next, operations of the deceleration-regeneration system 1 will be described referring to FIG. 2.

Figure 2:
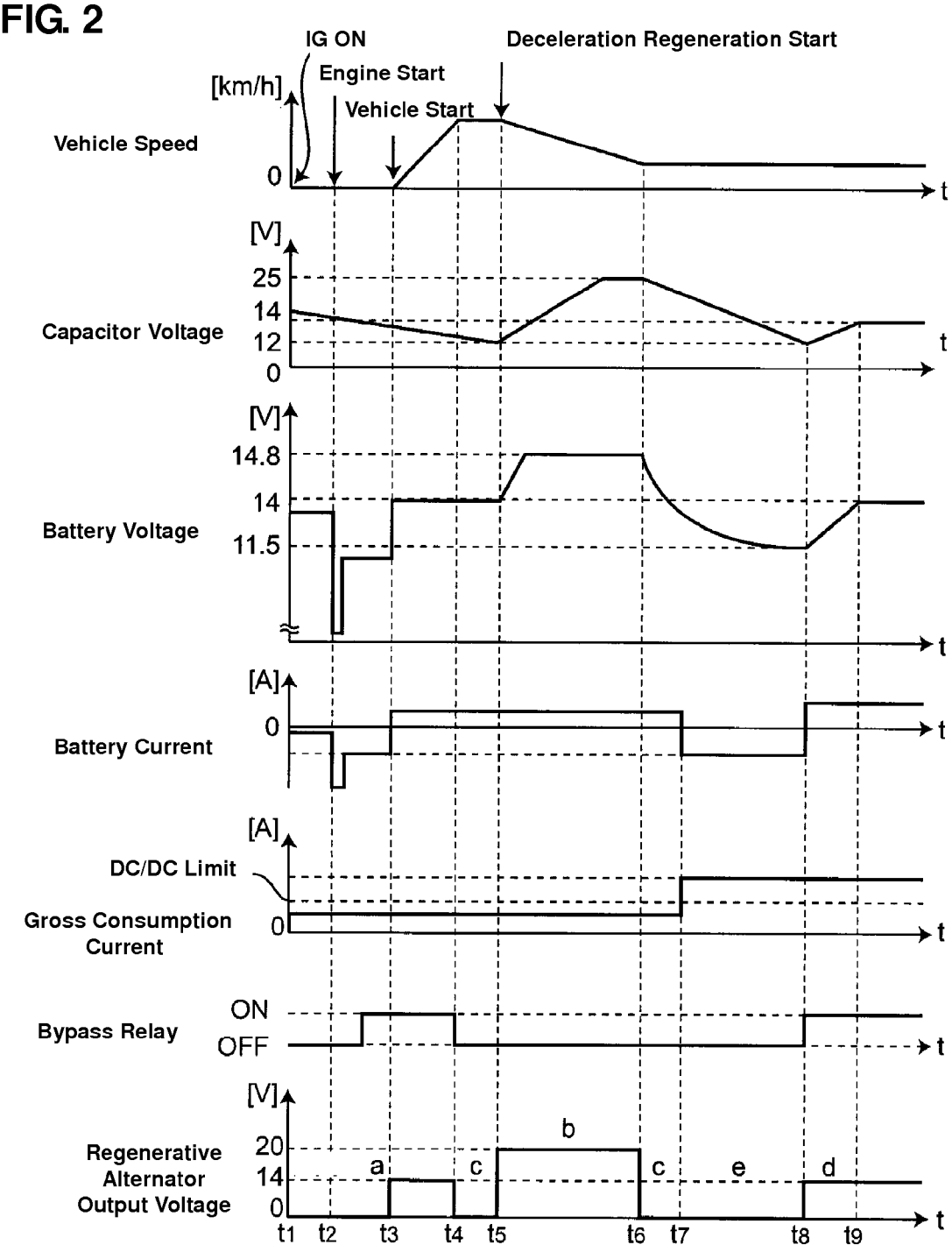
FIG. 2 is time charts schematically showing a system operation.

FIG. 2 schematically shows the operations of this system when the vehicle conducts acceleration, deceleration and constant-speed traveling after starting the engine, which is comprised of respective time charts of plural components of the system.

The time charts of FIG. 2 are shown by the ordinates indicating the vehicle speed, the voltage of the capacitor 30, the voltage of the battery 20, the current of the battery 20, the gross current consumed by the electric devices 60, 70, the state of ON/OFF of the bypass relay 80, and the output voltage of the regenerative alternator 10, and the abscissas indicating the time. Herein, the time when the value of the battery current is plus shows a power-storage (charging) period of time, meanwhile the time when the value of the battery current is minus shows a discharging period of time.

At the time of t1, the ignition, one of the electric devices, is turned ON. At this time, the regenerative alternator 10 does not conduct any power generation, and the power supply is conducted from the battery 20, keeping the bypass relay 80 in an OFF state. Herein, the period of time from the time t1 to t4 is indicated as the section a.

At the time t2, the starter switch 55 is turned ON, so that the battery 20 supplies the power to the starter 50, thereby starting the engine. At this time, while the voltage of the battery 20 decreases temporarily around to the voltage of 8 V, the bypass relay 80 is turned ON later on, so that the engine starts by receiving the power supply from the battery 20 and the capacitor 30.

At the time t3, the vehicle starts to move. At this time, the power generation of the low voltage (14 V) is conducted by the regenerative alternator 10. Since the bypass relay 80 has been already turned ON, the power is supplied to the battery 20 from the regenerative alternator 10.

At the time t4, the vehicle ends its acceleration. At this time, the bypass relay 80 is turned OFF, the regenerative alternator 10 ends its power generation, and the power is supplied to the electric devices 60, 70 from the capacitor 30 by way of the DC/DC convertor 40. Herein, the period of time from the time t4 to t5 is indicated as the section c.

At the time t5, the vehicle starts its deceleration, so that the regenerative alternator 10 starts its deceleration-regeneration power generation at the high voltage (20 V). At this time, keeping the bypass relay 80 in the OFF state, the power from the regenerative alternator 10 is stored at the capacitor 30 with a large amount of current, and the power from the regenerative alternator 10 is stored (charged) at the battery 20 by way of the DC/DC convertor 40 with a small amount of current. Also, the power from the regenerative alternator 10 is supplied to the electric devices 60, 70 by way of the DC/DC convertor 40. Herein, the period of time from the time t6 to t7 is indicated as the section b.

At the time t6, the vehicle ends its deceleration and then starts its constant-speed traveling. At this time, keeping the bypass relay 80 in the OFF state, the regenerative alternator 10 ends its deceleration-regeneration power generation, and the power from the capacitor 30 is supplied to the electric devices 60, 70 by way of the DC/DC convertor 40.

At the time t7, some electric devices are turned ON, so that the gross consumption current of the electric devices reaches the permissible output current-value (DC/DC limit) of the DC/DC convertor 40. At this time, keeping the bypass relay 80 in the OFF state and without conducting any power generation by the regenerative alternator 10, the power from the capacitor 30 is supplied to the voltage-decrease non-corresponding electric devices 70 by way of the DC/DC convertor 40, and the power from the battery 20 is supplied to the voltage-decrease corresponding electric devices 60. And, the specified electric devices 601, which belong to the voltage-decrease corresponding electric devices 60 and have been turned ON as described above, are compulsorily turned OFF. While FIG. 2 does not illustrate any decrease of the consumption current which is caused by the specified electric devices 601 being turned OFF, this decrease will be described specifically later referring to FIG. 3. Herein, the period of time from the time t7 to t8 is indicated as the section e.

At the time t8, the difference between the capacitor voltage and the battery voltage becomes 0.5 V or smaller. At this time, the bypass relay 80 is turned ON, thereby short-circuiting the first circuit portion 15 and the second circuit portion 65, so that the normal power generation of the low voltage (14 V) is conducted by the regenerative alternator 10. Thus, the power generated is supplied to the voltage-decrease non-corresponding electric devices 70 by way of the DC/DC convertor 40, whereas the power generated is supplied to the voltage-decrease corresponding electric devices 60 directly from the regenerative alternator 10. The power from the regenerative alternator 10 is, by way of the bypass circuit portion 85, stored (charged) at the battery 20 with a large amount of current. Further, the specified electric devices 601 which have been turned OFF are turned ON. While FIG. 2 does not illustrate any increase of the consumption current which is caused by the specified electric devices 601 being turned ON, this decrease will be described specifically later on referring to FIG. 3. Herein, the period of time from the time t8 to t9 is indicated as the section d.

At the time t9, the power storage of the battery 20 is complete.

Next, the system operation at the time the specified electric devices 601 are turned OFF, especially a change of the battery current relative to a change of the gross consumption current will be described referring to FIG. 3. Herein, it is to be noted that the electric devices to be turned ON, the timing of turning the electric devices ON relative to the vehicle speed, and the like shown in FIG. 3 are different from those shown in FIG. 2.

Figure 3:
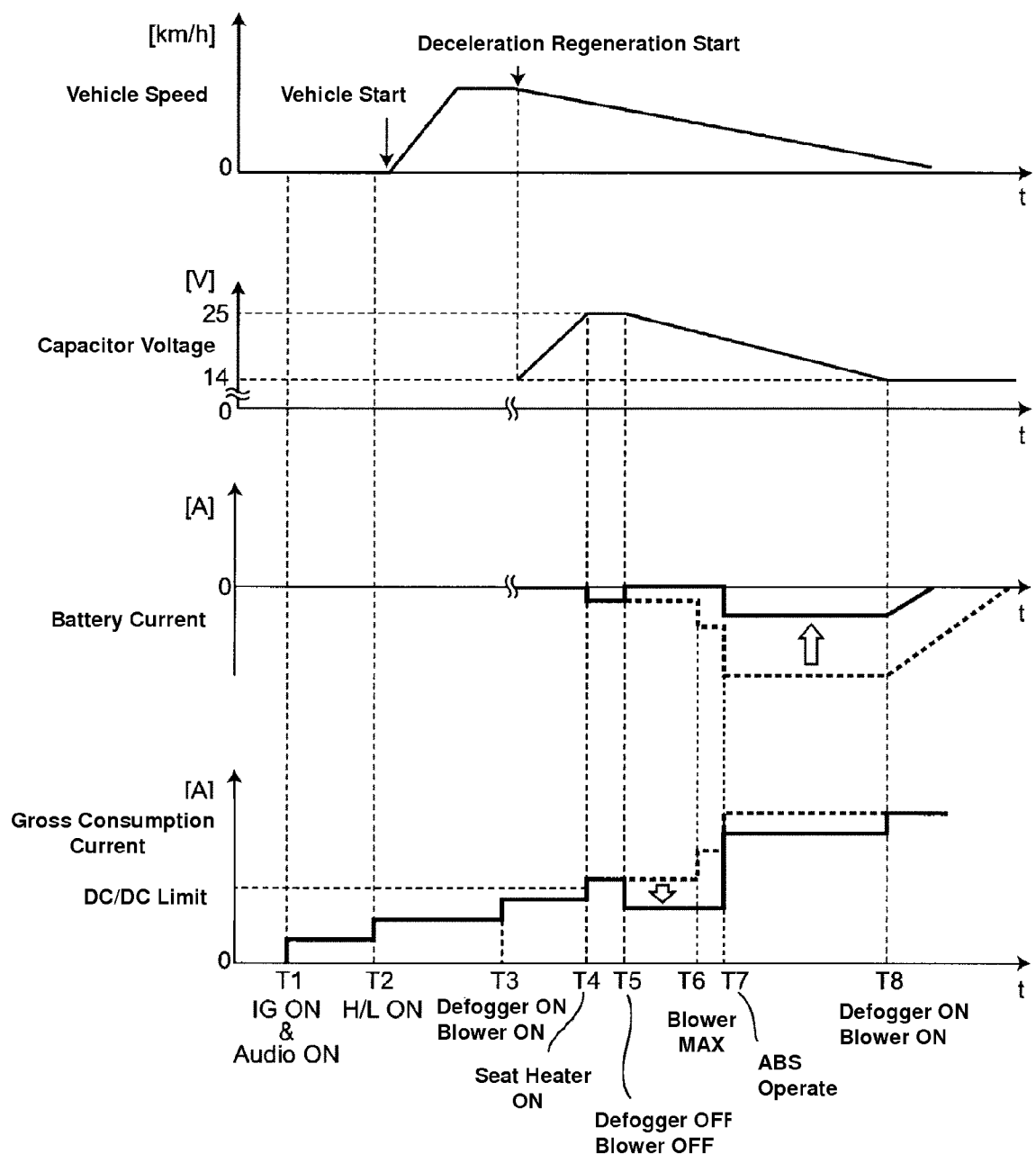
FIG. 3 is time charts showing the system operation when a specified electric load is turned OFF.

FIG. 3 shows how the gross consumption current changes when the output of the DC/DC convertor 40 reaches the permissible output current-value (DC/DC limit), thereby a defogger and a blower, which are predetermined as the specified electric devices 601, are turned OFF in a case in which plural electric devices are turned ON at the same time. FIG. 3 also shows how the current of the battery 20 or the capacitor 30 changes according to the above-described change of the gross consumption current. In FIG. 3, the above-described changes are shown as time charts, respectively, having the vertical axes (ordinate) of coordinates indicating the vehicle speed, the capacitor voltage, the battery voltage, and the gross consumption current and the lateral axes (abscissa) of coordinates indicating the time. Herein, the battery current and the gross consumption current according to the present embodiment are shown in bold solid lines, whereas those according to a comparative example in which the specified electric devices 601 are not turned OFF are shown in bold broken lines for comparison.

The ignition and the audio are turned ON at the time T1, the headlight is turned ON at the time T2, and the defogger and the blower, as the specified electric devices 601, are turned ON. In this embodiment, the deceleration regeneration is started at the time T3, thereby the power storage of the capacitor 30 begins.

At the time T4, the seat heater is turned ON, so that the gross consumption current exceeds the permissible output current-value of the output of the DC/DC convertor 40. The defogger and the blower, as the specified electric load devices 601, are turned OFF at the time T5 when a certain time (1 second, for example) has passed from the time T4 in order to prevent hunting.

The ABS is operated at the time T7. At the time T8, the defogger and the blower as the specified electric devices 601 which have been turned OFF are turned ON and the battery 20 is charged. Herein, in these time charts, a comparative example in which the output of the blower is controlled to be the maximum (blower MAX) at the time T6, keeping the defogger and the blower turned ON at the time T5 is respectively shown (see bold broken lines).

As apparent from comparing these two cases, i.e., a first case of the specified electric devices 601 being turned OFF (shown in the bold solid line in FIG. 3) and a second case of the blower being controlled at the maximum output, keeping the specified electric devices 601 turned ON (shown in the bold broken line in FIG. 3), during the period of the time T5 to the time T7, the power is supplied to the electric devices from the battery 20 in the above-described first case, whereas the power supply from the battery 20 to the electric devices may be unnecessary in the above-described second case because the gross consumption current decreases. Then, after the time T7, while the power supply from the battery 20 is conducted even in the first case in which the specified electric devices 601 are turned OFF, the consumption current of the battery 20 becomes small, compared with the case in which the specified electric devices 601 have not been turned OFF.

As described above, the peak of the consumption current of the battery 20 can be dispersed by temporarily turning the specified electric devices 601 OFF, that is—the maximum consumption current of the battery 20 can be decreased, so that the capacity of the battery 20 can be properly low.

Herein, while the defogger and the blower are applied as the predetermined specified electric devices 601 in the above-described embodiment, any other vehicle-onboard components of temperature adjusting means, such as a heater of an air conditioner or a heater of a seat cushion, may be applied as the specified electric devices 601. Further, the seat heater may be turned OFF additionally at the time T7 when the ABS is operated so that the gross consumption current does not exceed the permissible output current-value of the output of the DC/DC convertor all the time.

Hereafter, the operations of the deceleration regeneration system 1 will be described referring to FIGS. 4 through 7.

Figure 4:
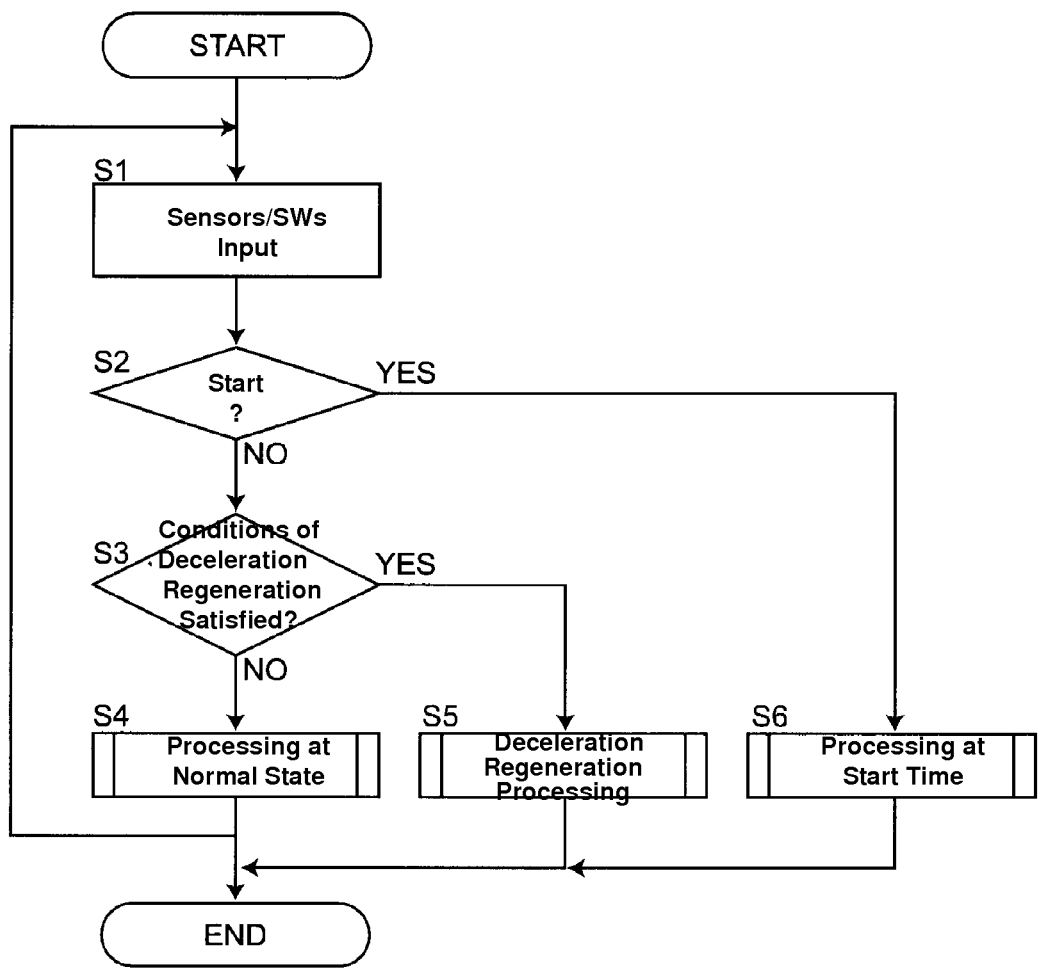
FIG. 4 is a flowchart showing switching of operations of processing at the times of start, deceleration, and a normal state.

At first, switching of the operations of processing at the times of start, deceleration, and the normal state will be described referring to a flowchart of FIG. 4. Subroutines of these respective processing will be described later on in detail referring to FIGS. 4 through 7.

Some information from various kinds of sensors and switches, such as the starter 50 and the battery 20, are inputted in step S1. In the next step S2, it is determined whether or not the vehicle is at the time of the start. When this determination made in the step S2 is NO, the operation proceeds to step S3, where it is determined whether or not conditions of the deceleration regeneration are satisfied. When the determination made in the step S2 is YES, the operation proceeds to a subroutine of the processing at the time of start of step S6 which is predefined. When the determination made in the step S3 is YES, the operation proceeds to a subroutine of a deceleration regeneration processing of step S5 which is predefined. When the determination made in the step S3 is NO, the operation proceeds to a subroutine of the processing at the normal state of step S4 which is predefined.

Figure 5:
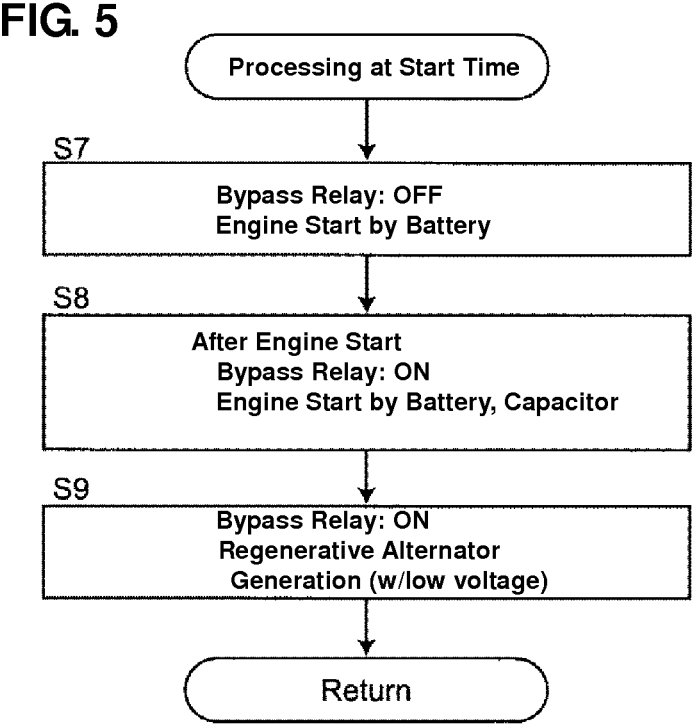
FIG. 5 is a flowchart showing the operation of the processing at the time of start.

Next, the operation of the processing at the time of start will be described referring to a flowchart of FIG. 5. Herein, refer to the section a (t1 to t4) of FIG. 2 where the processing at the time of start is conducted.

At first, in step S7, the bypass relay 80 is turned OFF, so that the engine is started by the battery 20. After the engine start, in step S8, the bypass relay 80 is turned ON, so that the engine is operated by the battery 20 and the capacitor 30. In step S9, the bypass relay 80 is kept in its ON state and the power generation of the low voltage (14 V) is conducted by the regenerative alternator 10. After this, the operation returns to a main routine.

Figure 6:
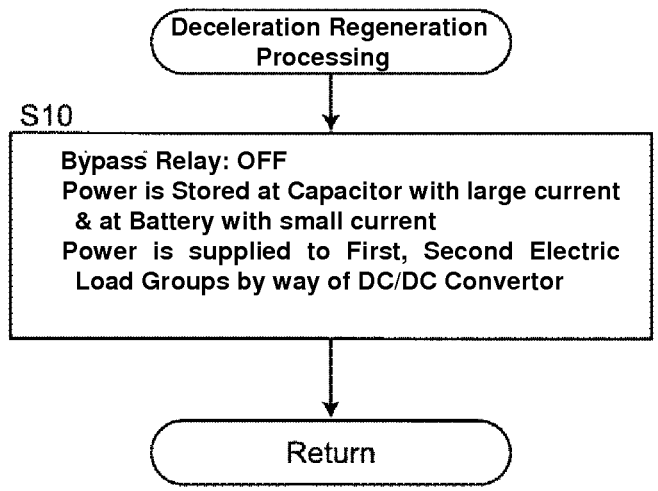
FIG. 6 is a flowchart showing the operation of the processing at the time of deceleration.

Next, the operation of the processing at the time of declaration will be described referring to a flowchart of FIG. 6. Herein, refer to the section b (t5 to t6) of FIG. 2 where the processing at the time of declaration is conducted.

In step S10, the bypass relay 80 is kept in the OFF state, the power generated at the regenerative alternator 10 during its deceleration regeneration is stored at the capacitor 30 with the large amount of current as well as at the battery 20, by way of the DC/DC convertor 40, with the small amount of current. The power generated at the regenerative alternator 10 is also supplied to the voltage-decrease corresponding electric devices 60 and the voltage-decrease non-corresponding electric devices 70 by way of the DC/DC convertor 40. Then, the operation returns to the main routine.

Figure 7:
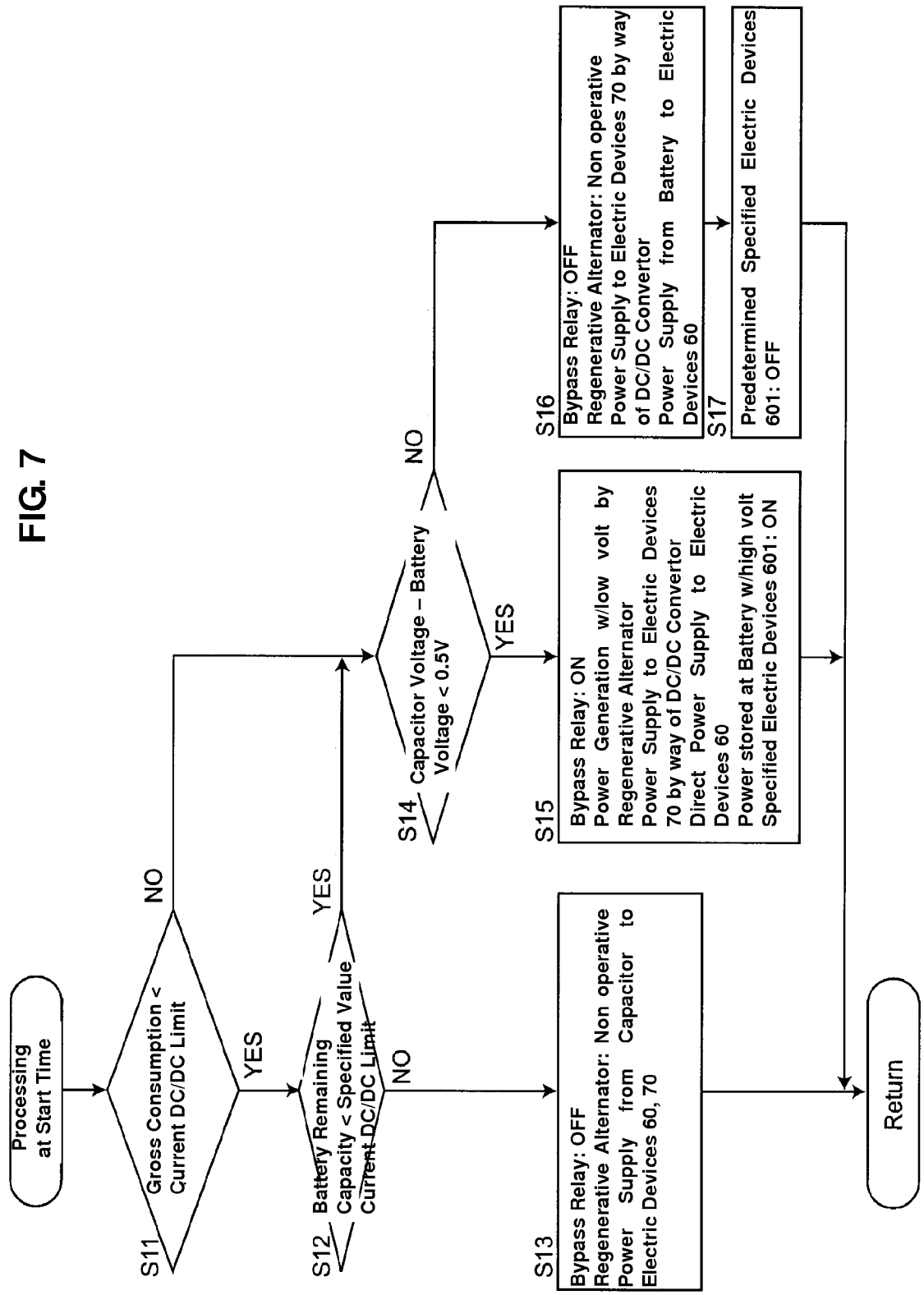
FIG. 7 is a flowchart showing the operation of the processing at the time of a normal state.

Next, the operation of the processing at the normal state will be described referring to a flowchart of FIG. 7. Herein, with respect to steps S13, S15 and S16, refer to the section c (t4 to t5 and t6 to t7), the section d (t8 to t9), and the section e (t7 to t8) of FIG. 2.

At first, in step S11, it is determined whether or not the gross consumption current of the electric devices 60, 70 is less than the permissible output current-value of the DC/DC convertor 40. Specifically, the output current of the DC/DC convertor 40 increases as the gross consumption current of the electric devices 60, 70 increases, and when the value of this output current reaches the above-described permissible limit value, i.e., DC/DC limit, the notice signal is outputted from the signal output portion 41 of the DC/DC convertor 40 as described above. Accordingly, the determination in the step S11 is achieved by determining whether or not the control unit 90 receives the notice signal outputted from the signal output portion 41. When the determination made in the step S11 is YES, that is—the gross consumption current is less than the permissible output current-value of the DC/DC convertor 40, it is further determined in the next step S12 whether or not the remaining capacity of the battery 20 is less than a specified value. Specifically, since the remaining capacity of the battery 20 can be presumed from the value of the battery's voltage detected by the above-described voltage sensor 21, it is determined whether or not the remaining capacity of the battery 20 is less than the specified value based on this presumptive value. When the determination made in the step S12 is NO, that is—the remaining capacity of the battery 20 is the specified value or more (the battery remaining capacity is high), in the step S13 the bypass relay 80 is turned OFF, the power is supplied to the electric devices 60, 70 from the capacitor 30 by way of the DC/DC converter 40, without generating any power by the regenerative alternator 10. Then, the operation returns to the main routine.

When the determination made in the step S11 is NO, that is—the gross consumption current is the permissible output current-value of the DC/DC convertor 40 or more, or when the determination made in the step S12 is YES even if the determination in the step S11 is YES, that is—the remaining capacity of the battery 20 is the specified value or less (the battery remaining capacity is low), it is determined in the next step S14 whether or not the difference between the voltage of the capacitor 30 (obtained from the voltage sensor 31) and the voltage of the battery 20 (obtained from the voltage sensor 21) is less than 0.5 V. When the determination made in the step S14 is NO, that is—the difference voltage is large, the operation proceeds to step S16, where the bypass relay 80 is turned OFF, no power generation is conducted by the regenerative alternator 10, the power is supplied to the voltage-decrease non-corresponding electric devices 70 by way of the DC/DC convertor 40, and the power from the battery 20 is supplied to the voltage-decrease corresponding electric devices 60. Then, in the next step S17, the predetermined specified electric devices 601 (the defogger, blower and others, for example) of the voltage-decrease corresponding electric devices 60 are compulsorily turned OFF. After this, the operation proceeds to the main routine.

After this, when the determination made in the step S14 is YES, that is—the difference voltage becomes small, the operation proceeds to step S15, where the bypass relay 80 is turned ON, the power generation of the low voltage is conducted by the regenerative alternator 10, the power is supplied to the voltage-decrease non-corresponding electric devices 70 by way of the DC/DC convertor 40, the power is supplied to the voltage-decrease corresponding electric devices 60 directly from the regenerative alternator 10, the power is stored (charged) at the battery 20, by way of the bypass relay 80, with the large amount of current, and the specified electric devices 601 which have been turned OFF are turned ON (at the same time or one by one according to necessity). After this, the operation proceeds to the main routine.

The present invention should not be limited to the above-described embodiment, and any other modifications or improvements may be applied within the scope of a sprit of the present invention.

For example, while the determination of the remaining capacity of the battery 20 is made based on presumption from the voltage of the battery 20 in the step S12 according to the above-described embodiment, it is possible to presume the remaining capacity of the battery 20 by measuring the value of the current of the battery 20.

Further, while the determination as to whether or not the difference between the voltage the capacitor 30 and the voltage of the battery 20 is less than 0.5 V is made in the step S14 according to the above-described embodiment, this threshold of the voltage difference can be properly set considering the electric performance of the battery 20 and the electric devices which are connected, which may be practically set to be 1.0 V or less, for example.

Moreover, while the determination of the difference between the voltage the capacitor 30 and the voltage of the battery 20 is made in the step S14, it may be determined, in place of this, whether or not a specified time (30 seconds, for example) has passed from the time when the gross consumption current reach the permissible output current-value of the DC/DC convertor 40. Then, when it is determined that the specified time has not passed yet, the operation may proceed to the step S15. Meanwhile, when it is determined that the specified time has passed, the operation may proceed to the step S16. This is because there is some relationships between the voltage difference of 0.5 V of the capacitor 30 and the battery 20 and the spending time to be required for the voltage difference of 0.5 V. Thus, the relationships may be obtained from previously-conducted experiments or something, so that the effects provided by the case of using the voltage difference can be also obtained by using this spending time.

Further, while the regenerative alternator 10 is used as a regenerative power-generator in the above-described embodiment, a motor generator or the like may be used in place of the regenerative alternator 10. Also, while the bypass relay 80 is used as the switch, a semiconductor switch may be used in place.

What is claimed is:

1. A power-source control apparatus for a vehicle, comprising:
   a battery;
   a regenerative generator capable of a deceleration-regeneration power generation conducted at the time of deceleration of the vehicle and a normal power generation conducted by an engine drive;
   a capacitor capable of storing power generated by the regenerative generator thereat;
   a DC/DC convertor capable of converting an output voltage and allowing an output current to flow up to a permissible limit value which corresponds to a capacity thereof;
   plural electric loads;
   a first circuit portion connecting the regenerative generator and the DC/DC convertor; and
   a second circuit portion connecting the DC/DC convertor and the plural electric loads;
   a bypass circuit portion connecting the first circuit portion and the second circuit portion, bypassing the DC/DC convertor;
   a bypass switch provided at the bypass circuit portion to change a state of connection/disconnection of the bypass circuit portion; and
   a control device to output signals for controlling the bypass switch, the regenerative generator, and the electric loads,
   wherein said capacitor is connected to said first circuit portion and said battery is connected to said second circuit portion, a connection state between the capacitor and the first circuit portion being configured such that the capacitor is electrically connected to said regenerative generator and said DC/DC convertor all the time, without being disconnected from the regenerative generator and the DC/DC convertor, and
   said control device is configured such that:
   when a gross consumption current of said plural electric loads is less than the permissible limit value of the output current of said DC/DC convertor, said bypass switch is controlled to provide the disconnection state of the bypass circuit portion such that the power stored at the capacitor is supplied to said plural electric loads by way of said DC/DC convertor;
   when the gross consumption current of the plural electric loads is the permissible limit value of the output current of the DC/DC convertor or greater and also a difference between a voltage of said capacitor and a voltage of said battery is a reference value or greater, said disconnection state of the bypass circuit portion is maintained such that the power stored at the capacitor is supplied to the plural electric loads by way of the DC/DC convertor, no power generation is conducted by said regenerative generator, and a specified electric load of the plural electric loads is turned OFF; and
   when the gross consumption current of the plural electric loads is the permissible limit value of the output current of the DC/DC convertor or greater and also said difference between the voltage of the capacitor and the voltage of the battery is less than said reference value, said bypass switch is controlled to provide the connection state of the bypass circuit portion, and power generation is conducted by the regenerative generator such that the power generated by the regenerative generator is supplied to the plural electric loads directly by way of the bypass circuit portion, turning ON said specified electric load which has been turned OFF.

2. The power-source control apparatus for a vehicle of claim 1, further comprising voltage sensors to detect said voltage of the capacitor and said voltage of the battery, respectively, wherein said determination of the difference between the voltage of the capacitor and the voltage of the battery becoming less than the reference value is made based on detection values of said voltage sensors.

3. The power-source control apparatus for a vehicle of claim 1, wherein said specified electric load is a temperature adjusting means of a specified vehicle-onboard component.

4. The power-source control apparatus for a vehicle of claim 1, wherein said plural electric loads are a group of electric loads capable of corresponding to voltage decrease, and another group of electric loads incapable of corresponding to voltage decrease are connected to said DC/DC convertor via a third circuit portion independent from said second circuit portion.

* * * * *